(12) United States Patent
Bouaziz

(10) Patent No.: US 9,796,269 B2
(45) Date of Patent: Oct. 24, 2017

(54) SWITCHABLE OPERATING DEVICE FOR A MOTOR VEHICLE

(71) Applicant: AUDI AG, Ingolstadt (DE)

(72) Inventor: Tahar Bouaziz, Ingolstadt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/116,138

(22) PCT Filed: Jun. 11, 2015

(86) PCT No.: PCT/EP2015/001172
§ 371 (c)(1),
(2) Date: Aug. 2, 2016

(87) PCT Pub. No.: WO2015/188936
PCT Pub. Date: Dec. 17, 2015

(65) Prior Publication Data
US 2017/0144546 A1   May 25, 2017

(30) Foreign Application Priority Data
Jun. 14, 2014   (DE) .................. 10 2014 008 851

(51) Int. Cl.
*G06F 3/0362* (2013.01)
*B60K 37/06* (2006.01)
(Continued)

(52) U.S. Cl.
CPC .............. *B60K 37/06* (2013.01); *B60K 35/00* (2013.01); *G06F 3/0362* (2013.01);
(Continued)

(58) Field of Classification Search
CPC ................... B60K 37/06; B60K 35/00; B60K 2350/1004; B60K 2350/102;
(Continued)

(56) References Cited

U.S. PATENT DOCUMENTS

| 7,225,413 B1 * | 5/2007 | Kuenzner | G05G 9/047 715/834 |
| 7,870,508 B1 * | 1/2011 | Wright | G06F 3/0482 715/853 |

(Continued)

FOREIGN PATENT DOCUMENTS

| DE | 296 04 717 U1 | 5/1996 |
| DE | 197 52 056 A1 | 5/1999 |

(Continued)

OTHER PUBLICATIONS

Translation of International Preliminary Report on Patentability dated Dec. 15, 2016 from International Patent Application No. PCT/EP2015/001172, 7 pages.

(Continued)

*Primary Examiner* — Richard Hong
(74) *Attorney, Agent, or Firm* — Staas & Halsey LLP

(57) ABSTRACT

A rotary actuator with an operating knob which is rotatable about a rotational axis is included in an operating device of a motor vehicle. The rotary actuator generates an actuating signal during rotation of the operating knob, and the operating knob is translationally deflectable transversely with respect to the rotational axis to alternately operate two control modules using the same operating device. A coupling device couples the operating device to a first control module and to a second control module. The coupling device is configured to output the actuating signal exclusively to the first control module in a first switching position and to output the actuating signal exclusively to the second control module in a second switching position and to switch from the first switching position to the second switching position during translational deflection of the operating knob in a predetermined deflection direction.

19 Claims, 1 Drawing Sheet

(51) Int. Cl.
*B60K 35/00* (2006.01)
*G06F 3/0484* (2013.01)

(52) U.S. Cl.
CPC .... *G06F 3/04842* (2013.01); *B60K 2350/102* (2013.01); *B60K 2350/1004* (2013.01); *B60K 2350/106* (2013.01)

(58) Field of Classification Search
CPC ............. B60K 2350/106; G06F 3/0362; G06F 3/04842; H04N 5/44543; H04N 7/0122; G05G 9/047
See application file for complete search history.

(56) References Cited

U.S. PATENT DOCUMENTS

| | | | |
|---|---|---|---|
| 2006/0171675 A1* | 8/2006 | Kolletzki | H04N 5/44543 386/230 |
| 2009/0262239 A1* | 10/2009 | Cho | H04N 7/0122 348/445 |
| 2010/0188343 A1* | 7/2010 | Bach | B60K 37/06 345/173 |

FOREIGN PATENT DOCUMENTS

| | | |
|---|---|---|
| DE | 102 07 872 A1 | 9/2003 |
| DE | 10 2009 052 928 A1 | 5/2011 |
| DE | 10 2014 008 851.0 | 6/2014 |
| EP | 1 122 633 A2 | 8/2001 |
| EP | PCT/EP2015/001172 | 6/2015 |
| WO | 99/27435 | 6/1999 |
| WO | 03/036455 A1 | 5/2003 |

OTHER PUBLICATIONS

German Office Action dated May 26, 2015 from German Patent Application No. 10 2014 008 851.0, 7 pages.
International Search Report in English dated Nov. 12, 2015 from PCT/EP2015/001172, 2 pages.
Chinese Office Action dated Apr. 7, 2017 from Chinese Patent Application No. 201580008345.4, 6 pages.

* cited by examiner

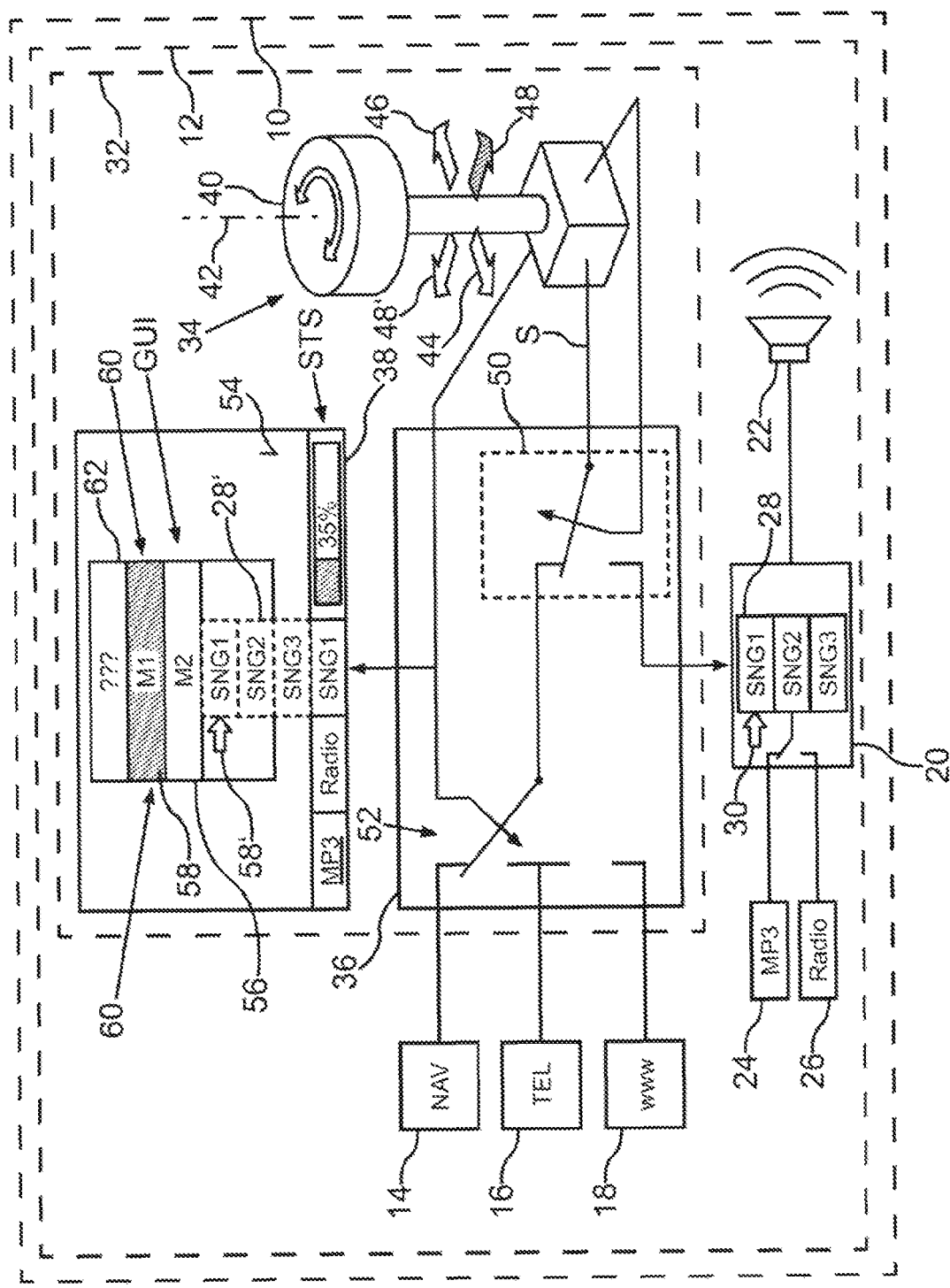

SWITCHABLE OPERATING DEVICE FOR A MOTOR VEHICLE

CROSS REFERENCE TO RELATED APPLICATIONS

This application is a U.S. national stage of International Application No. PCT/EP2015/001172, filed on Jun. 11, 2015. The International Application claims the priority benefit of German Application No. 10 2014 008 851.0, filed on Jun. 14, 2014. Both the International Application and German Application are incorporated by reference herein in their entirety.

BACKGROUND

Described herein is a method for alternately controlling two control modules of a motor vehicle. The control modules may be, for example, part of an infotainment system or a central processor device and may each be designed to control air-conditioning or media playback or navigation assistance. In addition, described herein are an operating device for carrying out the method and a motor vehicle having the operating device.

In the case of a motor vehicle, a plurality of functionalities may be provided by an individual control device or a central processor device. In connection with infotainment, such a central processor device is referred to as the infotainment system. This system provides, as functionalities, navigation assistance, media playback and telephony, for example. Each of these functionalities is provided by control modules provided for this purpose. In this case, each control module can be operated using the same operating device, for example a rotary/push actuator. Such a rotary/push actuator has an operating knob which can be rotated about a rotational axis and can be translationally deflected along the rotational axis by pushing. Provision may also be made for the rotary knob to be additionally able to be deflected transversely with respect to the rotational axis, which is also referred to as a four-way function.

An operating menu which lists the functions which can be selected using the operating knob, for example by rotating the latter, to be precise for that control module to which the operating device is currently coupled in each case, can be displayed on a screen of the infotainment system.

It must then also be possible to switch between the control modules using the operating device in order to be able to operate another of the control modules.

For this purpose, EP 1 122 633 A2 provides for an edge region to be displayed on the screen around the operating menu, the names of the available control modules being displayed at particular positions in the edge region. It is then possible to switch to the respective control module by tilting the operating knob in a corresponding deflection direction, as a result of which the associated operating menu is then displayed on the screen.

DE 10 2009 052 928 A1 likewise describes a rotary/push actuator which can be used to operate an operating menu of an infotainment system. In order to switch between control modules, further mechanical operating knobs for selecting a control module are provided in addition to the rotary/push actuator.

DE 296 04 717 U1 describes an operating device for a motor vehicle, in which it is possible to switch between the control modules by using a special operating menu using a rotary/push actuator having a four-way function.

A problem may arise in the related art if two control modules are active at the same time, for example if a media playback module plays music and a navigation assistance module indicates a route. If the user operates the navigation assistance module, for example, in order to stipulate a navigation destination and in the meantime wishes to change, for example, the song currently being played by the media playback module, he must first of all leave the operating menu for navigation assistance, activate the operating menu for media playback, select the new song there and then change back to navigation assistance again. The driver must then re-orient himself again in the operating menu for navigation assistance and must perhaps even reconstruct settings which have been lost.

SUMMARY

According to the method for alternately controlling two control modules of a motor vehicle described herein, it is possible to alternately operate two control modules using the same operating device in a motor vehicle.

Described herein is an operating device for a motor vehicle. The operating device has, in a manner known per se, a rotary actuator with an operating knob which is rotatable about a rotational axis. The rotary actuator may be part of a rotary/push actuator, for example. The rotary actuator generates an actuating signal during rotation of the operating knob in a known manner. The operating knob is additionally translationally deflectable transversely with respect to the rotational axis. In other words, the operating knob can therefore be displaced perpendicular to the rotational axis, for example in a translational plane, or can be tilted around a base point with respect to the rotational axis.

In order to now be able to alternately operate two control modules using the rotary actuator, a coupling device for coupling the operating device to a first control module and to a second control module is provided in the operating device. This coupling device is configured in such a manner that the actuating signal, which is generated during rotation of the operating knob, is output exclusively to the first control module in a first switching position of the coupling device and is output exclusively to the second control module in a second switching position. In order to switch between these two switching positions, a user must easily translationally deflect, that is to say push or tilt, the operating knob in a predetermined deflection direction transversely with respect to the rotational axis. In other words, provision is made for a switch from the first switching position to the second switching position during translational deflection of the operating knob into a predetermined deflection position.

The operating device described herein has the advantage that the user can operate or control the first control module by rotating the operating knob because a corresponding actuating signal is generated during rotation and is transmitted to the first control module. If the user then simply briefly translationally deflects the operating knob, that is to say pushes or taps it once transversely with respect to the rotational axis, the coupling device changes to the second switching position and the user can then directly control the second control module by rotating the operating knob.

The operating knob may be mounted in a monostable manner, that is to say a resetting device is designed to move the operating knob back into a rest position after translational deflection. The operating knob then always has the same rest position irrespective of whether the rotary actuator is currently coupled to the first control module or the second control module. Therefore, the user need not manually push the operating knob back and forth himself. The resetting device may be implemented, for example, by using a mechanical spring or an electric motor.

Provision may be made for the coupling device to be designed to switch back to the first switching position again after a predetermined period after switching. In other words, the user can then briefly tap the operating knob in order to translationally deflect it, can then make a setting in the second control module by rotating the operating knob and then no longer needs to take any further measure, but rather the rotary actuator is coupled to the first control module again automatically, that is to say automatically by the operating device. As a result, the user can therefore carry out an intermediate operating step in the second control module in a particularly simple and rapid manner and can then continue with operating the first control module.

If the user does not wish to wait for the period for switching-back, one advantageous development provides for the operating device to be designed to switch the coupling device back into the first switching position again in the event of deflection in the deflection direction again or in the event of deflection in the opposite deflection direction. The user can therefore tap the operating knob once in a particularly rapid manner, can make a setting in the second control module and can then return to operating the first control module again by tapping the operating knob again in the same deflection direction or in the opposite deflection direction.

Provision may be made for the operating device is designed to then switch the coupling device back into the first switching position again after a function of the second control module has been activated. In other words, the user can therefore briefly tap the operating knob, can then select a function in the second control module and can activate this function using the rotary actuator, as a result of which the coupling device also then additionally switches back into the first switching position again, with the result that operation of the first control module can be continued.

In an embodiment, the operating device also has a display device, for example a screen or a head-up display. The display device is designed to display a graphical user interface for the first control module, that is to say an operating menu or other graphical objects which can be selected using the rotary actuator for example, on a display surface. The display device additionally displays a status display of the second unit at an edge of the display surface. The status display changes with an operating state of the second control module. If the second control module is a media playback module for example, a title of the medium currently being played back, for example a song file or a video, can be displayed there. It is also possible to indicate, for example, how much of the corresponding track has already been played back, that is to say a playback time, for example. The user then gains an overview of both the operating possibilities for the first control module and an operating status of the second control module on the display surface in a particularly advantageous manner.

Operation by use of the rotary actuator may be enabled on the operating interface. In this case, a selection element for selecting graphical operating surfaces, that is to say, for example, menu entries or other graphical objects, for example icons, may then be provided. The selection element may include, for example, a pointer and/or a marker of a graphical operating surface. The operating device is designed to also align the selection element with the user interface in the first switching position of the coupling device. If the coupling device is then switched to the second switching position, with the result that the rotary actuator is now coupled to the second control module, the selection element is accordingly aligned with the status display. The selection element therefore jumps from the operating interface for the first control module to the status display of the second control module.

In this case, a further advantage results if settings of the user interface of the first control module are retained, while the selection element is aligned with the status display. This makes it possible to continue a process of operating the first control module after switching back to the first switching position without interruption.

The operating device has hitherto been described in such a manner that it can be used to operate only two control modules. The operating device is naturally also provided for the purpose of operating more than two control modules in the automobile. In this case, provision may be made for the first control module to be exchangeable in the operating device. In other words, a switching device is provided, which switching device is designed to switch between a plurality of predetermined control modules and hereby stipulate one of these control modules as the first control module. If the operating interface described is provided in this case, it is therefore possible to switch between different operating interfaces for different control modules, for example navigation, telephony, Internet browsing, and to always display the second control module, for example media playback, in the status display in the meantime. The user can then switch from the currently active first control module, for example navigation, to the status display or generally to the operation of the second control module at any time by translationally deflecting the operating knob in order to carry out an intermediate operation there, that is to say to carry out an individual operating action or a few operating actions in order to then switch back to the first control module again.

Also described herein is a motor vehicle which includes the operating device described herein. The motor vehicle may be in the form of an automobile, in particular a passenger vehicle.

In the motor vehicle, the first control module may include at least a navigation module and/or a telephony module and/or an air-conditioning module.

The second control module is may include a media playback module.

Finally, described herein is a method for alternately controlling two control modules of a motor vehicle by using an operating device having a rotary actuator. In the method too, in the described manner, an actuating signal, which is generated during rotation of an operating knob of the rotary actuator mounted rotatably about a rotational axis, is output exclusively to a first of the control modules and is output exclusively to the second control module if a translational deflection of the operating knob directed transversely with respect to the rotational axis is detected. This output of the actuating signal to the second control module has a time limit, however, namely it is output only until a switching-back criterion is satisfied. The switching-back criterion may be one or more of the events already described for triggering switching-back, that is to say translational deflection again or the expiry of the described period or the triggering of a function on the second control module, for example.

The method described herein may be carried out according to the features which have already been described in connection with the operating device described herein. For this reason, the corresponding developments of the method are not described here.

BRIEF DESCRIPTION OF THE DRAWINGS

These and other aspects and advantages will become more apparent and more readily appreciated from the following description of the exemplary embodiments, taken in conjunction with the accompanying drawing of which:

An exemplary embodiment in the single FIGURE is an illustration of an embodiment of the motor vehicle described herein.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The exemplary embodiment explained below is merely an example. However, in the case of the exemplary embodiment, the described components of the embodiment are each individual features which can be considered independently of one another and each also may be considered independently of one another and therefore can also be considered individually or in a combination other than that shown. Furthermore, the described embodiment can also be supplemented with further features which are described herein.

From a motor vehicle 10, the FIGURE shows a central processor device 12 which may be an infotainment system, for example. The processor device 12 may have a plurality of control modules 14, 16, 18, 20, each of which can provide a predetermined functionality of the processor device 12. For example, the control module 14 may be a navigation module, the control module 16 may be a telephony module, the control module 18 may be an Internet module for interchanging data with the Internet and the control module 20 may be a media playback module for outputting media data via an audio system 22 in a vehicle interior. In this case, each control module may include a program module and/or an electronic circuit. In the example shown, provision is made, in the case of the control module 20, for the module to be able to be coupled to a memory 24 for audio data, for example MP3 files, and to a radio receiver 26 for receiving broadcast radio. In this case, the control module 20 can switch between the memory 24 and the radio 26. In the example shown, the control module 20 is coupled to the memory 24 and plays a playback list or playlist 28 containing songs SNG1, SNG2, SNG3 from the memory 24. For the example shown, it is assumed that the control module 20 is currently playing the song SNG1, which is symbolized by a list position 30.

In order to operate the control modules 14, 16, 18, 20, the processor device 12 may have an operating device 32. The operating device 32 may be arranged, for example, in a center console of the motor vehicle 10. The operating device 32 may have a rotary actuator 34, an evaluation device 36, for example an evaluation circuit, and a display device 38 which may include, for example, a screen in a center console or a head-up display.

The rotary actuator 34 may have an operating knob 40 which may be mounted rotatably about a rotational axis 42 and may be translationally deflectable along deflection directions 44, 46, 48. The rotary actuator 34 generates an actuating signal S during rotation of the rotary knob 40.

The evaluation device 36 may have a coupling device 50 and a switching device 52. The coupling device 50 can be used to alternately switch between the switching device 52 and the control module 20. The control module 20 may be referred to as a second control module.

The switching device 52 can be used to switch between the remaining control modules 14, 16, 18. The control module 14 currently selected using the switching device 52 may be referred to as a first control module.

The display device 38 may have an operating interface GUI for the control module 14 currently selected by the switching device 52 on a display surface 54, that is to say the screen surface for example. A status display STS for the second control module, the control module 20, can be displayed at a lower edge of the display surface 54 in the example. In the example, the status display STS can indicate that the memory 24 is currently being used (MP3 display), the song SNG1 from the playlist 28 is currently being played and a particular percentage, for example 35 percent, of the song 1 has currently already been played.

The operating interface GUI may have an operating menu 56, for example. In the operating menu 56, a selection element 58, for example a marker or a pointer (not illustrated here), may be aligned with a currently selected menu item M1. A user can shift the selection element 58 to another menu item M2 by rotating the operating knob 40. The menu entries or menu items M1, M2 are selectable graphical objects.

Switching suggestions 60 on the display surface 54 are used to indicate to the user that he can switch the switching device 52 by translationally deflecting the operating knob 40 in one of the deflection directions 44, 46 and can thereby activate an operating interface for one of the other control modules 16, 18. The operating interface GUI is then hidden as a result of this switching.

However, for quickly switching for the purpose of operating the control module 20, the user can deflect the operating knob 40 in a predetermined deflection direction, here the deflection direction 48 (hatched direction arrow). Instead of the switching device 52, the coupling device 50 is then switched to a second switching position and the rotary actuator 54 is then coupled to the control module 20. Provision may then be made, for example, for the current list position 30 to be able to be changed by rotating the operating knob 40. In this case, provision may be made for the selection element 58 to be deflected from the operating interface GUI to the status display STS by the display device 38 on the display surface 54. For example, provision may be made for an image 28' of the playback list 28 to be displayed and, instead of the selection element 58, for a selection element 58' for the playback list 28 to be provided, which selection element 58' can be changed over using the operating knob 40. The operating interface GUI can continue to be displayed on the display surface 54 in the meantime.

Provision may then be made for the user to be able to switch back to the operating interface GUI again by translationally deflecting the operating knob 40 again in the deflection direction 48 or in the opposite deflection direction 48' (non-hatched direction arrow).

Provision may also be made for the coupling device 50 to automatically switch back to the switching device 52 again after a predetermined period. Provision may also be made for the coupling device 50 to also switch back to the switching device 52 again when a new song is selected.

The operating interface GUI may also have a search field 62 into which the user can input a search term for searching in the operating menu 56, for example. While the user navigates in the operating menu 56 using the operating knob 40, that is to say the coupling device 50 is set to the switching device 52, provision may also be made for the first element in the list to be landed on, that is to say the search field 62, as a result of the operating knob 40 being pushed in the deflection direction 48', for example.

Overall, the example shows how the rotary/push actuator having a four-way function makes it possible to easily change between two control modules to be operated.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v DIRECTV*, 358 F3d 870, 69 USPQ2d 1865 (Fed. Cir. 2004).

The invention claimed is:

1. An operating device for a motor vehicle having control modules including predetermined control modules which include a first control module, and a second control module separate from the predetermined control modules, the operating device comprising:
   a rotary actuator including an operating knob which is rotatable about a rotational axis, the rotary actuator being configured to generate an actuating signal during rotation of the operating knob, and the operating knob being translationally deflectable transversely with respect to the rotational axis;
   a switching device configured to switch between the predetermined control modules based on a switch setting of the switching device among a plurality of switch settings of the switching device, and to select one of the predetermined control modules as the first control module when the switching device is in a first switch setting among the plurality of switch settings; and
   a coupling device, connected in series in a cascaded manner with the switching device, the switching device being connected upstream of the coupling device, the coupling device configured:
      to couple the operating device to the first control module via the switching device and the coupling device when the coupling device is in a first switching position and the switching device is in the first switch setting,
      to couple the operating device to the second control module when the coupling device is in a second switching position,
      to output the actuating signal exclusively to the first control module when the coupling device is in the first switching position and the switching device is in the first switch setting,
      to output the actuating signal exclusively to the second control module when the coupling device is in the second switching position, and
   to switch from the first switching position to the second switching position during translational deflection of the operating knob in a predetermined deflection direction.

2. The operating device as claimed in claim 1, wherein the operating knob is mounted in a monostable manner, and includes a resetting device configured to move the operating knob back into a rest position after translational deflection of the operating knob.

3. The operating device as claimed in claim 1, wherein the coupling device is configured to switch the coupling device back to the first switching position a predetermined period after switching to the second switching position.

4. The operating device as claimed in claim 1, wherein the operating device is configured to switch the coupling device back into the first switching position after switching to the second switching position if the operating knob is deflected in the deflection direction again, if the operating knob is deflected in a direction opposite to the deflection direction, and/or after a predetermined function of the second control module has been activated by the operating device.

5. The operating device as claimed in claim 1, further comprising a display device configured to display a graphical user interface for the first control module on a display surface and to display a status display of the second control module at an edge of the display surface.

6. The operating device as claimed in claim 5, wherein a selection element to select graphical operating surfaces is displayed on the display device, and the operating device is configured to position the selection element at the graphical user interface for the first control module when the coupling device is in the first switching position, and to position the selection element at the status display for the second control module when the coupling device is in the second switching position.

7. The operating device as claimed in claim 6, wherein settings of the graphical user interface are retained while the selection element is positioned at the status display.

8. The operating device as claimed in claim 1, wherein the coupling device couples the operating device to the second control module when the coupling device is in the second switching position, without regard to the switch setting of the switching device.

9. A motor vehicle, comprising:
   a chassis;
   at least one vehicle system;
   control modules to control at least one of the at least one vehicle system, the control modules including predetermined control modules which include a first control module, and a second control module separate from the predetermined control modules; and
   an operating device including:
      a rotary actuator including an operating knob which is rotatable about a rotational axis, the rotary actuator being configured to generate an actuating signal during rotation of the operating knob, and the operating knob being translationally deflectable transversely with respect to the rotational axis,
      a switching device configured to switch between the predetermined control modules based on a switch setting of the switching device among a plurality of switch settings of the switching device, and to select one of the predetermined control modules as the first control module when the switching device is in a first switch setting among the plurality of switch settings, and
      a coupling device, connected in series in a cascaded manner with the switching device, the switching device being connected upstream of the coupling device, the coupling device configured to couple the operating device to the first control module via the switching device when the coupling device is in a first switching position and the switching device is in the first switch setting, to couple the operating device to the second control module when the coupling device is in a second switching position, to output the actuating signal exclusively to the first control module when the coupling device is in the first switching position and the switching device is in the first switch setting, to output the actuating signal exclusively to the second control module when the coupling device is in the second switching position, and to switch from the first switching position to the second switching position during translational deflection of the operating knob in a predetermined deflection direction.

10. The motor vehicle as claimed in claim 9, wherein the first control module includes at least one of a navigation module, a telephony module, an air-conditioning module, and an Internet module.

11. The motor vehicle as claimed in claim 9, wherein the second control module is a media playback module.

12. The motor vehicle as claimed in claim 9, wherein
the switching device switches between the predetermined control modules according to translational deflection of the operating knob in another predetermined deflection direction, when the coupling device is in the first switching position, and
the another predetermined deflection direction is perpendicular to the predetermined deflection direction.

13. The motor vehicle as claimed in claim 9, further comprising a display device configured to display a graphical user interface (GUI) corresponding to the first control module on a first area of a display screen of the display device and to display status information corresponding to the second control module on a second area of the display screen.

14. The motor vehicle as claimed in claim 13, wherein
a menu displayed on the GUI is navigable by rotation of the operating knob to move a selection element between menu items of the menu if the coupling device is in the first switching position, and
the selection element automatically moves to the second area of the display screen if the coupling device is switched from the first switching position to the second switching position.

15. The motor vehicle as claimed in claim 14, wherein
information displayed by the GUI when the coupling device is in the first switching position continues to be displayed after the coupling device is switched from the first switching position to the second switching position and the selection element is automatically moved to the second area of the display screen, and
the second area of the display screen includes selectable graphical objects to control a function of the second control module.

16. A method for alternately controlling control modules of a motor vehicle by an operating device having a rotary actuator, the method comprising:
outputting, by a coupling device, an actuating signal, generated during rotation of an operating knob mounted rotatably about a rotational axis of the rotary actuator, exclusively to the first control module, when the coupling device is in a first switching and a switching device is in a first switch setting among a plurality of switch settings of the switching device, the coupling device being connected in series in a cascaded manner with the switching device, the switching device being connected upstream of the coupling device;
switching, by the coupling device, output of the actuating signal exclusively to a second control module of the control modules when a translational deflection of the operating knob directed transversely with respect to the rotational axis is detected causing the coupling device to switch to a second switching position, until a switching-back criterion is satisfied and the coupling device switches back to the first switching position; and
switching, by the switching device, between predetermined control modules among the control modules based on a switch setting of the switching device among the plurality of switch settings of the switching device, the switching device establishing one of the predetermined control modules as the first control module when the switching device is in the first switch setting among the plurality of switch settings.

17. The method as claimed in claim 16, wherein the switching-back criterion includes automatically switching output of the actuating signal from the second control module to one of the predetermined control modules a predetermined amount of time after the switching output of the actuating signal.

18. The method as claimed in claim 16, wherein the switching-back criterion includes switching output of the actuating signal from the second control module to one of the predetermined control modules when the translational deflection of the operating knob directed transversely with respect to the rotational axis is detected after a setting in the second control module is made.

19. The method as claimed in claim 16, further comprising:
displaying a graphical user interface corresponding to the first control module on a first area of a display screen and displaying status information corresponding to the second control module on a second area of the display screen;
moving a selection element between menu items of a menu displayed in the first area of the display screen in response to rotation of the operating knob prior to the switching output of the actuating signal; and
shifting the selection element automatically to the second area of the display screen in response to the switching output of the actuating signal.

* * * * *